United States Patent
Kondo et al.

(10) Patent No.: US 9,988,501 B2
(45) Date of Patent: Jun. 5, 2018

(54) METHOD OF PRODUCING POLYMER MICROPARTICLES

(71) Applicant: Toray Industries, Inc., Tokyo (JP)

(72) Inventors: Yoshinori Kondo, Nagoya (JP); Yuji Echigo, Nagoya (JP); Akira Kitamura, Nagoya (JP); Hiroshi Takezaki, Nagoya (JP)

(73) Assignee: Toray Industries, Inc. (JP)

( * ) Notice: Subject to any disclaimer, the term of this patent is extended or adjusted under 35 U.S.C. 154(b) by 0 days. days.

(21) Appl. No.: 15/311,260

(22) PCT Filed: Jun. 1, 2015

(86) PCT No.: PCT/JP2015/065813
§ 371 (c)(1),
(2) Date: Nov. 15, 2016

(87) PCT Pub. No.: WO2015/190342
PCT Pub. Date: Dec. 17, 2015

(65) Prior Publication Data
US 2017/0088677 A1 Mar. 30, 2017

(30) Foreign Application Priority Data
Jun. 9, 2014 (JP) ................. 2014-118263

(51) Int. Cl.
C08G 63/02 (2006.01)
C08J 3/14 (2006.01)
B29B 9/00 (2006.01)
B29B 9/12 (2006.01)

(52) U.S. Cl.
CPC *C08J 3/14* (2013.01); *B29B 9/00* (2013.01); *B29B 9/12* (2013.01); *B29B 2009/125* (2013.01); *C08J 2381/06* (2013.01); *C08J 2429/04* (2013.01); *C08J 2439/06* (2013.01); *C08J 2467/04* (2013.01)

(58) Field of Classification Search
CPC .......................................................... C08J 3/12
USPC .......................................... 428/402; 528/335
See application file for complete search history.

(56) References Cited

U.S. PATENT DOCUMENTS

| | | | |
|---|---|---|---|
| 2011/0070442 A1 | 3/2011 | Asano et al. | |
| 2011/0263730 A1 | 10/2011 | Aridomi et al. | |
| 2013/0309497 A1 | 11/2013 | Takezaki et al. | |
| 2014/0349113 A1* | 11/2014 | Saito | C08J 3/14 |
| | | | 428/402 |

FOREIGN PATENT DOCUMENTS

| | | |
|---|---|---|
| JP | 2007-254176 A | 10/2007 |
| JP | 2011-38024 A | 2/2011 |
| JP | 2013-177532 A | 9/2013 |
| JP | 2014-43566 A | 3/2014 |
| WO | 2009/142231 A1 | 11/2009 |
| WO | 2010/044340 A1 | 4/2010 |
| WO | 2012/105140 A1 | 8/2012 |

\* cited by examiner

*Primary Examiner* — Terressa Boykin
(74) *Attorney, Agent, or Firm* — DLA Piper LLP (US)

(57) ABSTRACT

A method of producing polymer particles includes, in a system in which a polymer A and a polymer B are dissolved in and mixed with an organic solvent to undergo phase separation into two phases which are a solution phase containing the polymer A as a major component and a solution phase containing the polymer B as a major component, continuously adding an emulsion including the polymer A, the polymer B and the organic solvent, and a poor solvent for the polymer A to a vessel continuously to allow the polymer A to precipitate; and separating polymer A particles from the vessel continuously.

9 Claims, 1 Drawing Sheet

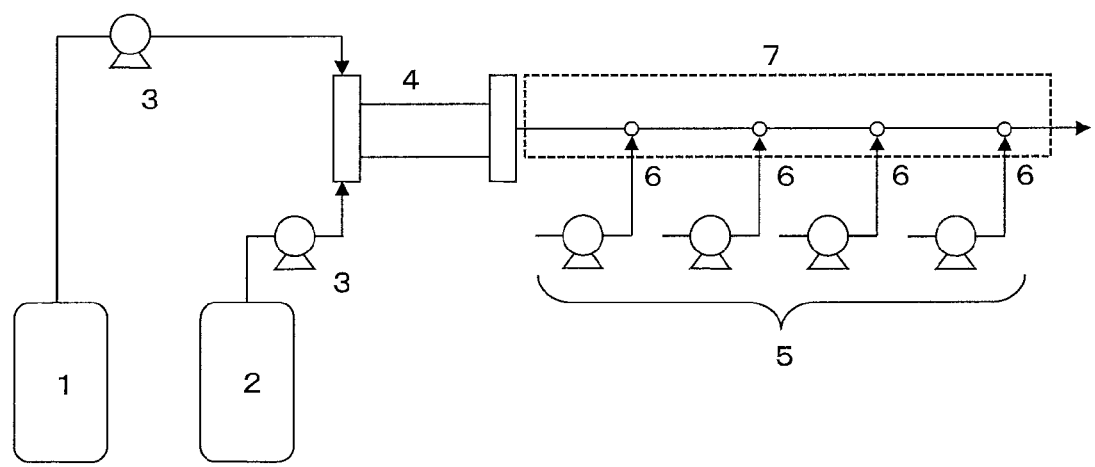

METHOD OF PRODUCING POLYMER MICROPARTICLES

TECHNICAL FIELD

This disclosure relates to a method of producing polymer particles; and more particularly relates to a method of simply and conveniently producing polymer particles with a narrow particle diameter distribution.

BACKGROUND

Polymer particles refer to particles composed of a polymer or polymers and typically particles having various diameters ranging from dozens of nanometers to dozens of hundreds of micrometers in size. Unlike molded polymer articles such as films, fibers, injection-molded articles, or extrusion-molded articles, polymer particles have a larger specific surface and, by making good use of this and the structure of the particle, the polymer particle has been utilized for proper modification and improvement of various materials. Examples of major applications include modifiers for cosmetics, additives for toners, rheology modifiers such as coating materials, products for medical diagnostic tests, and additives to molded products such as automobile materials and building materials. In particular, by taking advantage of their particle structure, the polymer particles have recently been used as a raw material for rapid prototyping or rapid manufacturing which is a technique used to produce a made-to-order molded product in conjunction with a laser-processing technique.

More recently, there is a need for the polymer particles to have high heat resistance, high solvent resistance, and more uniform particle diameter distribution.

What is known thus far is a method of producing polymer particles comprising dissolving two kinds of polymers in an organic solvent and bringing emulsions composed of each phase into contact with a poor solvent to allow polymer particles to be formed (WO 2009/142231).

That method is characterized in that the diameter of the emulsion is readily adjusted and, in addition, the particle diameter distribution is narrow. At the same time, the method is an effective technique capable of producing a wide variety of polymers into particles, and in particular an effective technique to obtain particles of engineering plastics and high-heat-resistant polymers with a high glass transition temperature and a high melting temperature.

Further, according to Japanese Patent Application Laid-Open Publication No. 2013-177532, polymer particles with uniform particle diameter distribution can be produced even in a larger production scale by controlling the stirring Reynolds number at the time of the emulsion formation.

What is known in those techniques is that a stir condition, a temperature condition, and the like upon precipitation of particles are required to be controlled to stabilize the average particle diameter in each batch.

Meanwhile, a method of mixing a silicon compound using a static mixer capable of continuous synthesis is known as a method of producing particles of submicrometers or larger in size, which method can be applicable for a method of continuously synthesizing silica particles (Japanese Patent Application Laid-Open Publication No. 2007-254176).

However, the production methods described in WO 2009/142231 and Japanese Patent Application Laid-Open Publication No. 2013-177532 involve carrying out batch production and the average particle diameter can possibly vary from batch to batch. Further, there is a need for continuous production that makes the production more efficient and enables facilities to be smaller when large scale production is carried out.

It could therefore be helpful to provide a method of producing polymer particles with lower variability in the average particle diameter and a smaller particle diameter distribution index, which method enables efficient mass production.

SUMMARY

We thus provide:
A method of producing polymer particles comprising, in a system in which a polymer A and a polymer B are dissolved in and mixed with an organic solvent to undergo phase separation into two phases which are a solution phase containing the polymer A as a major component and a solution phase containing the polymer B as a major component, continuously adding an emulsion comprising the polymer A, the polymer B and the organic solvent, and a poor solvent for the polymer A to a vessel continuously to allow the polymer A to precipitate; and taking out polymer A particles from the vessel continuously.

It is preferred that the emulsion formed by continuously supplying the polymer A, the polymer B, and the organic solvent to a mixing apparatus be added to the vessel.

It is preferred that the emulsion formed by continuously supplying each of a liquid obtained by dissolving the polymer A in the organic solvent and a liquid obtained by dissolving the polymer B in the organic solvent to the mixing apparatus be added to the vessel.

It is preferred that the organic solvents in each of the phases when the phase separation into two phases occurs be identical.

It is preferred that the poor solvent be continuously added from two or more addition ports.

It is preferred that the vessel be a tubular vessel.

It is preferred that the mixing apparatus be a tubular mixer.

It is preferred that the mixing apparatus be a mixing apparatus in which the static mixing is housed.

It is preferred that formation of the emulsion and addition of the poor solvent be carried out in a continuous tubular vessel.

We provide means of mass production by efficient processes of manufacturing and have made it possible to continuously produce microparticulate and polymer particles with lower variability in the average particle diameter and a smaller particle diameter distribution index.

BRIEF DESCRIPTION OF THE DRAWING

FIG. 1 provides a schematic view showing one example of the apparatus that produces particles used in our method of producing particles.

DESCRIPTION OF SYMBOLS

1: Polymer A dissolving tank
2: Polymer B dissolving tank
3: Supply pump
4: Tubular mixer
5: Poor solvent addition pump
6: Poor solvent addition line
7: Tubular vessel

DETAILED DESCRIPTION

We provide a method of producing polymer particles, the method comprising, in a system in which a polymer A and a polymer B are dissolved in and mixed with an organic solvent and the resulting mixture undergoes phase separation into two phases which are a solution phase containing the polymer A as a major component (hereinafter, may be referred to as a polymer A solution phase) and a solution phase containing the polymer B as a major component (hereinafter, may be referred to as a polymer B solution phase), allowing an emulsion to be continuously formed in a tubular mixer and then bringing a poor solvent for the polymer A continuously into contact therewith to allow the polymer A to precipitate.

"A system in which polymer A and polymer B are dissolved in and mixed with an organic solvent and the resulting mixture undergoes phase separation into two phases: a solution phase containing the polymer A as a major component and a solution phase containing the polymer B as a major component" refers to a system in which when the polymer A and the polymer B are mixed with the organic solvent and the mixture separates into two phases: a solution phase that mainly contains the polymer A and a solution phase that mainly contains the polymer B.

The use of such a system in which the phase separation takes place enables an emulsion to be formed by mixing and allowing for emulsification under conditions where the phase separation takes place.

Whether or not a polymer is dissolved in the above is determined based on whether or not it is dissolved in an organic solvent at more than 1% by mass at a temperature at which the method is carried out, that is, a temperature when the polymer A and the polymer B are dissolved and mixed to allow two phase separation to take place.

In this emulsion, a polymer A solution phase is a dispersed phase and a polymer B solution phase is a continuous phase; and by bringing this emulsion into contact with a poor solvent for the polymer A, the polymer A is able to precipitate from the polymer A solution phase in the emulsion, thereby obtaining polymer particles composed of the polymer A.

As long as the polymer particles are obtained by using the polymer A, the polymer B, the organic solvent that dissolves these, and the poor solvent for the polymer A, a combination thereof is not in particular restricted in our production method. The polymer A refers to a high molecular weight polymer and is preferably a synthetic polymer that does not occur in nature and more preferably a water-insoluble polymer, as exemplified by a thermoplastic resin and a thermoset resin.

Specific examples of the thermoplastic resin include vinyl-based polymers, polyesters, polyamides, polyarylene ethers, polyarylene sulfides, polyether sulfones, polysulfones, polyether ketones, polyetherether ketones, polyurethanes, polycarbonates, polyamideimides, polyimides, polyetherimides, polyacetals, silicone, and copolymers thereof.

As the polymer A, the thermoset resin may be used. Specific examples thereof include epoxy resins, benzoxazine resins, vinyl ester resins, unsaturated polyester resins, urethane resins, phenol resins, melamine resins, maleimide resins, cyanate ester resins, and urea resins.

Of those, epoxy resins are preferably used because their heat resistance and adhesiveness are high. Used as the epoxy resin is, for example, glycidyl ether type epoxy resins obtained from a compound having a hydroxyl group within the molecule and epichlorohydrin, glycidyl amine type epoxy resins obtained from a compound having an amino group within the molecule and epichlorohydrin, glycidyl ester type epoxy resins obtained from a compound having a carboxyl group within the molecule and epichlorohydrin, alicyclic epoxy resins obtained by oxidizing a compound having a double bond within the molecule, or epoxy resins in which two or more types of the groups selected from these are present in combination within the molecule.

In addition, a curing agent can be used in combination with the epoxy resin. Examples of the curing agent that is used in combination with the epoxy resin include aromatic amines, aliphatic amines, polyamideamines, carboxylic anhydrides and Lewis acid complexes, acidic curing catalysts, and basic curing catalysts.

Examples of a preferred resin used as the polymer A include resins that are polymers with a high heat resistance, which resins have a glass transition temperature or melting temperature of more than 100° C. Specific examples include polyether sulfones, polycarbonates, polyamides, polyphenyleneethers, polyetherimides, polyphenylenesulfides, polyolefins, polysulfones, polyesters, amorphous polyarylates, polyamideimides, polyether ketones, polyetherether ketones, epoxy resins, and polyester-based thermoplastic elastomers; and more preferred examples include crystalline thermoplastic resins.

One or more kinds of the above polymer A can be used. These preferred resins have excellent thermal and/or mechanical properties and are preferred from the viewpoint in that particles obtained by using the preferred resin are able to have narrow particle diameter distribution and are applicable to uses where conventional particles have been unable to be adopted.

The upper limit of preferred weight average molecular weight of the polymer A is preferably 100,000,000, more preferably 10,000,000, still more preferably 1,000,000, in particular preferably 500,000, and most preferably 100,000. In addition, the lower limit of preferred weight average molecular weight of the polymer A is preferably 1,000, more preferably 2,000, still more preferably 5,000, and in particular preferably 10,000.

The weight average molecular weight used herein refers to weight average molecular weight measured by gel permeation chromatography (GPC) using dimethyl formamide as an organic solvent and converted in terms of polystyrene.

When the measurement is not feasible with dimethyl formamide, tetrahydrofuran is employed. When such measurement is still not feasible, hexafluoroisopropanol is employed. When the measurement is not feasible even with hexafluoroisopropanol, the measurement is carried out using 2-chloronaphthalene.

Because the point is that particles precipitate upon the contact with the poor solvent, the polymer A is preferably one that is insoluble in the poor solvent. The polymer that is not dissolved in poor solvents described later is preferred and a water-insoluble polymer is in particular preferred.

The water-insoluble polymer refers to a polymer that has a solubility to water at room temperature of 1% by mass or less, preferably 0.5% by mass or less, and still more preferably 0.1% by mass or less.

The crystalline thermoplastic resin refers to one having a crystalline part of the crystalline phase and amorphous phase inside of the polymer. These can be distinguished by a differential scanning calorimetry method (DSC method). That is, it refers to one in which the heat of melting is measured in DSC measurement. With regard to the value of the heat of melting, preferred is a polymer with 1 J/g or more, preferably 2 J/g or more, and more preferably 5 J/g or more; and still more preferably 10 J/g or more. On this occasion, the DSC measurement refers to the heat of melting that is measured when the temperature is once increased at a rate of increasing temperature of 20° C./min in a temperature range from 30° C. to a temperature that is 30° C. higher than the melting point of such a polymer; kept for one minute, decreased to 0° C. at 20° C./min, kept for one minute, and then increased again at 20° C./min.

Examples of the polymer B include thermoplastic resins and thermoset resins. Preferred examples are soluble in the organic solvent that dissolves the polymer A and the poor solvent for the polymer A. Of these, ones that are soluble in the above solvent and soluble in an alcohol-based solvent or water are more preferred from the viewpoint of excellent handling properties in industrial settings. Further ones that are further soluble in an organic solvent and soluble in methanol, ethanol, or water are in particular preferred.

Specific examples of the polymer B include synthetic resins such as poly(vinyl alcohol) (may be a fully saponified type or a partially saponified type poly(vinyl alcohol)), poly(vinyl alcohol-ethylene)copolymer (may be a fully saponified type or a partially saponified type poly(vinyl alcohol-ethylene)copolymer), polyvinylpyrrolidone, poly(ethylene glycol), sucrose fatty acid esters, poly(oxyethylene fatty acid ester), poly(oxyethylene lauryl fatty acid ester), poly(oxyethylene glycol monofatty acid ester), poly(oxyethylene alkylphenyl ether), poly(oxyalkyl ether), polyacrylic acid, sodium polyacrylate, polymethacrylic acid, sodium polymethacrylate, polystyrene sulfonic acid, sodium polystyrene sulfonate, polyvinyl pyrrolidinium chloride, poly(styrene-maleic acid)copolymer, amino poly(acrylamide), poly(paravinyl phenol), polyallylamine, polyvinyl ether, polyvinyl formal, poly(acrylamide), poly(methacrylamide), poly(oxyethylene amine), poly(vinyl pyrrolidone), poly(vinyl pyridine), polyaminosulfone, and polyethyleneimine; disaccharides such as maltose, cellobiose, lactose, and sucrose; celluloses and derivatives such as cellulose, chitosan, hydroxyethyl cellulose, hydroxypropyl cellulose, methylcellulose, ethylcellulose, ethylhydroxy cellulose, carboxymethylethyl cellulose, carboxymethyl cellulose, sodium carboxymethyl cellulose, and cellulose ester; polysaccharides or derivatives thereof such as amylose and derivatives thereof, starch and derivatives thereof, dextrin, cyclodextrin, and sodium alginate and derivatives thereof; gelatin, casein, collagen, albumin, fibroin, keratin, fibrin, carrageenan, chondroitin sulfate, arabian gum, agar, and proteins. Preferred are poly(vinyl alcohol) (may be a fully saponified type or a partially saponified type poly(vinyl alcohol)), poly(vinyl alcohol-ethylene)copolymer (may be a fully saponified type or a partially saponified type poly(vinyl alcohol-ethylene)copolymer), polyethylene glycol, sucrose fatty acid esters, poly(oxyethylene alkylphenyl ether), poly(oxyalkyl ether), poly(acrylic acid), poly(methacrylic acid); celluloses and derivatives such as carboxymethyl cellulose, hydroxyethyl cellulose, hydroxypropyl cellulose, methylcellulose, ethylcellulose, ethylhydroxy cellulose, carboxymethylethyl cellulose, carboxymethyl cellulose, sodium carboxymethyl cellulose, and cellulose ester; and polyvinylpyrrolidone. More preferred are poly(vinyl alcohol) (may be a fully saponified type or a partially saponified type poly(vinyl alcohol)), poly(vinyl alcohol-ethylene)copolymer (may be a fully saponified type or a partially saponified type poly(vinyl alcohol-ethylene)copolymer), polyethylene glycol, celluloses and derivatives such as carboxymethyl cellulose, hydroxyethyl cellulose, hydroxypropyl cellulose, methylcellulose, ethylcellulose, ethylhydroxy cellulose, carboxymethylethyl cellulose, carboxymethyl cellulose, sodium carboxymethyl cellulose, and cellulose esters; and polyvinylpyrrolidone. In particular preferred are celluloses and derivatives such as poly(vinyl alcohol) (a fully saponified type or a partially saponified type poly(vinyl alcohol)), poly(ethylene glycol), carboxymethyl cellulose, hydroxyethyl cellulose, hydroxypropyl cellulose, methylcellulose, ethylcellulose, and ethylhydroxy cellulose; and polyvinylpyrrolidone.

The upper limit of preferred weight average molecular weight of the polymer B is preferably 100,000,000, more preferably 10,000,000, still more preferably 1,000,000, in particular preferably 500,000, and most preferably 100,000. In addition, the lower limit of preferred weight average molecular weight of the polymer B is preferably 1,000, more preferably 2,000, still more preferably 5,000, and in particular preferably 10,000.

The weight average molecular weight used herein refers to weight average molecular weight that is measured by gel permeation chromatography (GPC) using water as a solvent and converted in terms of polyethylene glycol.

When the measurement is not feasible with water, dimethyl formamide is employed. When the measurement is still not feasible even with it, tetrahydrofuran is employed. Further, when the measurement is still not feasible, hexafluoroisopropanol is employed.

The organic solvent in which the polymer A and the polymer B are dissolved is a solvent capable of dissolving the polymer A and polymer B that are employed and is selected according to the kind of each of the polymers.

Specific examples thereof include aliphatic hydrocarbon-based solvents such as pentane, hexane, heptane, octane, nonane, n-decane, n-dodecane, n-tridecane, cyclohexane, and cyclopentane; aromatic hydrocarbon solvents such as benzene, toluene, and xylene; ester-based solvents such as ethyl acetate and methyl acetate; halogenated hydrocarbon-based solvent such as chloroform, bromoform, methylene chloride, 1,2-dichloroethane, 1,1,1-trichloroethane, chlorobenzene, and 2,6-dichlorotoluene; ketone-based solvents such as acetone, methylethylketone, methyl isobutyl ketone, and methylbutyl ketone; alcohol-based solvents such as methanol, ethanol, 1-propanol, and 2-propanol; aprotic polar solvents such as N-methyl-2-pyrrolidone, dimethyl sulfoxide, N,N-dimethyl formamide, N,N-dimethyl acetamide, propylene carbonate, trimethyl phosphate, 1,3-dimethyl-2-imidazolidinone, and sulfolane; carboxylic acid solvents such as formic acid, acetic acid, propionic acid, butyric acid, and lactic acid; ether solvents such as anisole, diethyl ether, tetrahydrofuran, diisopropyl ether, dioxane, diglyme, and dimethoxyethane; or mixtures thereof. Preferred are aromatic hydrocarbon solvents, aliphatic hydrocarbon-based solvents, halogenated hydrocarbon-based solvent, alcohol-based solvent, ether solvents, aprotic polar solvents, and carboxylic acid solvents. More preferred are alcohol-based solvents, aprotic polar solvents, and carboxylic acid solvents, which are water-soluble solvents; and significantly preferred are aprotic polar solvents and carboxylic acid solvents. The most preferred are N-methyl-2-pyrrolidone, dimethyl sulfoxide, N,N-dimethyl formamide, N,N-dimethyl acetamide, propylene carbonate, 1,3-dimethyl-2-imidazolidinone, formic acid, and acetic acid from the viewpoint that those have a wide range of applications to the polymer A due to their easy availability and their ability to dissolve a wide range of polymers and those can be uniformly mixed with a solvent that may be preferably used as a poor solvent that is described later such as water and alcohol-based solvents.

Two or more kinds of these organic solvents may be employed or may be mixed to use. A single organic solvent is preferred from the viewpoint in that particles with a relatively small single particle diameter and narrow particle diameter distribution can be obtained and from the viewpoint of avoiding to be bothered with the step of separation at the time of recycling organic solvent used and reducing process load in the production. Further preferred is a single organic solvent that dissolves both of the polymer A and the polymer B.

The poor solvent for the polymer A refers to a solvent that does not allow the polymer A to be dissolved. The solvent that does not allow for the dissolution refers to ones with a solubility to the poor solvent for the polymer A of 1% by mass or less, more preferably 0.5% by mass or less, and still more preferably 0.1% by mass or less.

In the production method, the poor solvent for the polymer A is used. Such a poor solvent is preferably an organic solvent that is a poor solvent for the polymer A and dissolves the polymer B. This enables polymer particles composed of the polymer A to precipitate in an efficient fashion. In addition, it is preferred that the organic solvent in which the polymer A and the polymer B are dissolved be uniformly mixed with the poor solvent for the polymer A.

For the polymer A to precipitate with high efficiency, a larger difference between the solubility parameter (hereinafter, may be referred to as an SP value) of the polymer A and the poor solvent for the polymer A is preferred. The lower limit is preferably 1 $(J/cm^3)^{1/2}$ or more, more preferably 2 $(J/cm^3)^{1/2}$ or more, still more preferably 3 $(J/cm^3)^{1/2}$ or more, and in particular preferably 4 $(J/cm^3)^{1/2}$ or more. In addition, the upper limit is not in particular restricted and is preferably 20 $(J/cm^3)^{1/2}$ or less from the viewpoint of the affinity with the organic solvent that allows the polymer A and the polymer B to be dissolved, more preferably 18 $(J/cm^3)^{1/2}$ or less, still more preferably 16 $(J/cm^3)^{1/2}$ or less, and in particular preferably 14 $(J/cm^3)^{1/2}$ or less.

The poor solvent is an organic solvent or water and varies in the kind of polymer A employed and desirably in the kind of both polymers A and B employed. Specific examples thereof include solvents containing at least one or more kinds selected from aliphatic hydrocarbon-based solvents such as pentane, hexane, heptane, octane, nonane, n-decane, n-dodecane, n-tridecane, cyclohexane, and cyclopentane; aromatic hydrocarbon-based solvents such as benzene, toluene, and xylene; ester-based solvents such as ethyl acetate and methyl acetate; halogenated hydrocarbon-based solvents such as chloroform, bromoform, methylene chloride, 1,2-dichloroethane, 1,1,1-trichloroethane, chlorobenzene, and 2,6-dichlorotoluene; ketone-based solvents such as acetone, methylethylketone, methyl isobutyl ketone, and methylbutyl ketone; alcohol-based solvents such as methanol, ethanol, 1-propanol, and 2-propanol; aprotic polar solvents such as dimethyl sulfoxide, N,N-dimethyl formamide, N,N-dimethyl acetamide, trimethyl phosphate, N-methyl-2-pyrrolidone, 1,3-dimethyl-2-imidazolidinone, and sulfolane; carboxylic acid solvents such as formic acid, acetic acid, propionic acid, butyric acid, and lactic acid; ether solvents such as anisole, diethyl ether, tetrahydrofuran, diisopropyl ether, dioxane, diglyme, and dimethoxyethane; and water.

From the viewpoint of microparticulating the polymer A into particles in an efficient fashion, the poor solvent is preferably an aromatic hydrocarbon-based solvent, an aliphatic hydrocarbon-based solvent, an alcohol-based solvent, an ether solvent, and water; most preferably an alcohol-based solvent and water; and in particular preferably water.

It is to be noted that when our method is carried out, it is possible to carry out at a temperature that is equal to or higher than the boiling point of the solvent employed. In that case, it is preferred to carry out in a pressure resistant vessel under pressurized conditions.

The polymer A, the polymer B, the organic solvent that dissolves these, and the poor solvent for the polymer A are appropriately selected and combined, thereby allowing the polymer A to precipitate in an efficient fashion to yield the polymer particles.

The polymer A, the polymer B, the organic solvent that dissolves those, and the poor solvent for the polymer A are appropriately selected and combined, thereby allowing the polymer A to precipitate in an efficient fashion to yield the polymer particles.

The liquid in which the polymers A and B are mixed with and dissolved in the organic solvent that dissolves those needs to undergo the phase separation into two phases: a solution phase containing the polymer A as a major component and a solution phase containing the polymer B as a major component. On this occasion, the organic solvent of the solution phase containing the polymer A as a major component and the organic solvent of the solution phase containing the polymer B as a major component may be the same or different and it is preferred to be substantially the same organic solvent.

Conditions to form the state of two phase separation vary in the kind of the polymers A and B, the molecular weight of the polymers A and B, the kind of the organic solvents, the concentration of the polymers A and B, and temperature and pressure at which our method is attempted to be carried out.

A larger difference between the SP values of the polymer A and that of the polymer B is preferred to obtain the condition in which the state of phase separation is easily achieved.

On this occasion, the difference of the SP value is 1 $(J/cm^3)^{1/2}$ or more, more preferably 2 $(J/cm^3)^{1/2}$ or more, still more preferably 3 $(J/cm^3)^{1/2}$ or more, in particular preferably 5 $(J/cm^3)^{1/2}$ or more, and extremely preferably 8 $(J/cm^3)^{1/2}$ or more. The phase separation becomes easier to take place if the SP value is in this range.

The upper limit of the difference of the SP value is not in particular restricted as long as both polymer A and polymer B are dissolved in the organic solvent; and is preferably 20 $(J/cm^3)^{1/2}$ or less, more preferably 15 $(J/cm^3)^{1/2}$ or less, and still more preferably 10 $(J/cm^3)^{1/2}$ or less.

The SP value used herein is calculated by Fedor's estimation method and is calculated based on cohesive energy density and molar molecular volume (hereinafter may be referred to as calculation method) ("SP value; Fundamental, Application, and Calculation method" by Hideki Yamamoto, Johokiko Co., Ltd., published on Mar. 31, 2005).

When the calculation is not feasible by this method, the SP value is calculated by an experiment method wherein a solubility parameter is determined based on whether or not dissolution in a known organic solvent is achieved (hereinafter, may be referred to as an experiment method) and the calculated value is used instead ("Polymer Handbook Fourth Edition" by (J. Brand), Wiley, published in 1998).

Further, with regard to vinyl-based polymers including rubbery polymers, the SP value of matrix resin shall be obtained by the above technique and the obtained value is used.

To select the condition in which the state of phase separation is achieved, the discrimination is feasible using a ternary phase diagram that can be prepared by a simple preliminary experiment involving observation of the state when a ratio of three components, namely the polymer A, the polymer B, and the organic solvent that dissolves those is varied.

As for preparation of the phase diagram, when the polymers A and B are mixed with and dissolved in the solvent at a freely selected ratio and the resulting mixture is left to stand, whether or not interfaces are brought about is determined at at least three points or more, preferably five points or more, and more preferably 10 points or more to make a rigorous distinction between an area that separates into two phases and an area that becomes one phase, thereby enabling determination of the condition in which the state of phase separation is achieved.

On this occasion, to determine whether or not the state of phase separation is achieved, the polymers A and B are adjusted to a freely selected ratio of the polymers A and B to the solvent at a temperature and a pressure at which our method is attempted to be carried out; the polymers A and B are fully dissolved; the resultant is, after the dissolution, adequately stirred and left to stand for three days; and whether or not the phase separation takes place is macroscopically checked.

However, when a sufficiently stable emulsion is formed, macroscopic phase separation may not in some cases take place even if it is left to stand for three days. In that case, whether or not the phase separation takes place is microscopically checked by using an optical microscope, a phase-contrast microscope, or the like and the phase separation is determined.

The phase separation is formed by separating into the polymer A solution phase composed mainly of the polymer A and the polymer B solution phase composed mainly of the polymer B in a solvent. At that time, the polymer A solution phase is a phase in which the polymer A is mainly distributed and the polymer B solution phase is a phase in which the polymer B is mainly distributed. At that time, the polymer A solution phase and the polymer B solution phase seems to have a volume ratio depending on the kind of the polymers A and B and the amount of the polymer used.

The concentration of each of the polymers A and B based on the organic solvent at which the state of the phase separation can be achieved and that is a feasible concentration in industrial settings is, on the premise that the concentration is within a range of the polymers dissolving in the organic solvent, preferably more than 1% by mass and not more than 50% by mass, more preferably more than 1% by mass and not more than 30% by mass, and still more preferably 2% by mass to 20% by mass.

With regard to the interfacial tension between two phases, the polymer A solution phase and the polymer B solution phase, because both phases are an organic solvent the interfacial tension is small. That property allows emulsions formed to be stably maintained and, therefore, the particle diameter distribution seems to become narrow. In particular, when the organic solvent in the polymer A phase is identical to that in polymer B phase, the effect is significant.

As for the interfacial tension between two phases, the interfacial tension is too small to be directly measured by a commonly used pendant drop method comprising adding a different kind of solution to the solution for measurement but the interfacial tension can be estimated by making an estimate from the surface tension of each phase with air. When the surface tension of each phase with air is designated as $r_1$ and $r_2$, the interfacial tension, $r_{1/2}$ is estimated using the absolute value of $r_{1/2}=r_1-r_2$. On this occasion, a preferred range of this $r_{1/2}$ is more than 0 and not more than 10 mN/m, more preferably more than 0 and not more than 5 mN/m, still more preferably more than 0 and not more than 3 mN/m, and in particular preferably more than 0 and not more than 2 mN/m.

The viscosity between two phases affects the average particle diameter and particle diameter distribution and a smaller viscosity ratio tends to lead to a narrower particle diameter distribution. When the viscosity ratio is defined as polymer A solution phase/polymer solution phase B under temperature conditions under which our method is attempted to be carried out, a preferred range is not less than 0.1 and not more than 10; a more preferred range is not less than 0.2 and not more than 5; a still more preferred range is not less than 0.3 and not more than 3; a particularly preferred range is not less than 0.5 and not more than 1.5; and a significantly preferred range is not less than 0.8 and not more than 1.2.

A temperature suitable for carrying out our method is not in particular restricted as long as it is a temperature at which the polymer A and polymer B employed are dissolved and, from the viewpoint of industrial feasibility, is −50° C. to 300° C., preferably −20° C. to 280° C., more preferably 0° C. to 260° C., still more preferably 10° C. to 240° C., in particular preferably 20° C. to 220° C., and most preferably 20° C. to 200° C. A suitable pressure is, from the viewpoint of industrial feasibility, a reduced pressure state to 100 atm, preferably 1 atm to 50 atm, still more preferably, 1 atm to 30 atm, and in particular preferably 1 atm to 20 atm.

When production of particles is carried out under a condition of 80° C. or more, because a condition under high pressure may in some cases be employed and thus the polymer A, the polymer B and the organic solvent are in a state where thermal breakdown easily advances, it is preferred to carry out in a state where the concentration of oxygen is as low as possible. At that time, the concentration of oxygen in the atmosphere in the dissolving tank is preferably 5% by volume or less, more preferably 1% by volume or less, more preferably 0.1% by volume or less, still more preferably 0.01% by volume or less, and in particular preferably 0.001% by volume or less.

Because it is substantially difficult to measure the concentration of trace oxygen concentration, the concentration of oxygen shall be theoretically calculated from the capacity of the inside of the dissolving tank, the oxygen volume concentration of inert gas, the pressure for displacement in the vessel, and the number of times thereof.

Further, an antioxidant may be used as an additive from the viewpoint of preventing oxidative deterioration of raw materials used for making particles.

The antioxidant is added for the purpose of complementing radicals; and thus examples thereof include phenolic antioxidants, sulfur-based antioxidants, aromatic amine-based antioxidants, sulfur-based antioxidants, and phosphorus-based antioxidants.

Specific examples of these antioxidants include phenol, hydroquinone, p-methoxyphenol, benzoquinone, 1,2-naphthoquinone, cresol, catechol, benzoic acid, hydroxybenzoic acid, salicylic acid, hydroxybenzenesulfonic acid, 2,5-di-t-butylhydroquinone, 6-t-butyl-m-cresol, 2,6-di-t-butyl-p-cresol, 4-t-butylcatechol, 2,4-dimethyl-6-t-butylphenol, 2-t-butylhydroquinone, and 2-t-butyl-4-methoxyphenol.

The concentration of the antioxidant is not in particular restricted and is preferably 0.001 to 10% by mass based on the mass of the polymer B, more preferably 0.01 to 5% by mass, and most preferably 0.05 to 3% by mass. Further, an acid compound may be added to use from the viewpoint of eliminating and reducing coloration of raw materials used for making particles and preventing modification thereof.

As the acid compound, L-ascorbic acid, erythorbic acid, lactic acid, malic acid, fumaric acid, phthalic acid, tartaric acid, formic acid, citric acid, glycolic acid, salicylic acid, maleic acid, malonic acid, glutaric acid, oxalic acid, adipic acid, succinic acid, hydrosuccinic acid, polyacrylic acid, amino acids such as L-glutamic acid, aspartic acid, adenosine, arginine, ornithine, guanine, sarcosine, cysteine, serine, and tyrosine; and inorganic acids such as hydrochloric acid, sulfuric acid, phosphoric acid, nitric acid, pyrophosphoric acid, and tripoly phosphoric acid can be used. Of these, citric acid, tartaric acid, malonic acid, oxalic acid, adipic acid, maleic acid, malic acid, phthalic acid, succinic acid, and polyacrylic acid can be used preferably.

The concentration of the acid compound is not in particular restricted and is preferably 0.001 to 10% by mass based on the mass of the polymer B, more preferably 0.01 to 5% by mass, and most preferably 0.05 to 3% by mass.

Upon formation of emulsions, the emulsion is formed such that the polymer A solution phase comes to be particulate droplets. In general, when the volume of the polymer B solution phase is larger than the volume of the polymer A solution phase when the phase separation occurs, emulsions with such morphology tend to be formed. In particular, a volume ratio of the polymer A solution phase is preferably 0.4 or less with the total volume of both phases as 1 and preferably between 0.4 and 0.1. An appropriate range can be set up by, when the above phase diagram is prepared, concurrently measuring a volume ratio at the concentration of each component.

In a system in which when these polymer A, polymer B and organic solvent are mixed to undergo separation into two phases: the solution phase containing the polymer A as a major component and the solution phase containing the polymer B as a major component, an emulsion is formed at a ratio at which the polymer A, the polymer B, and the organic solvent undergo the separation into two phases: the solution phase containing the polymer A as a major component and the solution phase containing the polymer B as a major component.

The particles obtained by the production method are particles with narrow particle diameter distribution. That is because highly uniform emulsions are obtained at the stage of emulsion formation. This trend is pronounced when a single solvent that dissolves both of the polymer A and the polymer B is employed. Because of this, to attain mixing performance sufficient to continuously form the emulsion it is preferred that a mixing apparatus be used.

To supply raw materials to the mixing apparatus, one obtained by dissolving the polymer A in the organic solvent and one obtained by dissolving the polymer B in the organic solvent may be each supplied. Also, the polymer A, the polymer B, and the organic solvent may be individually supplied. Further, one obtained by dissolving the polymer A and the polymer B in the organic solvent may be supplied.

As just described, it is important to continuously add the poor solvent for the polymer A to a vessel to allow the polymer A to precipitate, and take continuously out the polymer particles composed of the polymer A using the system in which the phase separation into two phases: the solution phase containing the polymer A as a major component and the solution phase containing the polymer B as a major component takes place when the polymer A and the polymer B are dissolved in and mixed with the organic solvent. FIG. 1 shows a schematic view of one example in which a tubular mixer and a tubular vessel are used to carry out such a production method.

The dissolving tank 1 filled with a solution obtained by dissolving the polymer A in the organic solvent and the dissolving tank 2 filled with a solution obtained by dissolving the polymer B in the organic solvent are each supplied into the tubular mixer 4 via the supply pump 3. Emulsification of the supplied liquid advances in the tubular mixer; and the liquid is supplied to tubular vessel 7. The poor solvent addition line 6 is connected to the tubular vessel; and the poor solvent is continuously added to the tubular vessel from two or more sites in the poor solvent addition line 6 using the addition pump 5, which thereby allows the polymer A to be microparticulating into the particles. From an outlet of the tubular vessel 7, a dispersion liquid in which the particles crash out is continuously recovered.

The shape of the mixing apparatus is not in particular restricted as long as the polymer A solution and the polymer B solution can obtain shear stress sufficient to allow for the emulsion formation and may be tank-shaped or may be tubular.

The type of the tank-shaped mixing apparatus may be quadrangular prism type or may be cylindrical type as long as the emulsification is feasible when the polymer A and the polymer B are dissolved in and mixed with the organic solvent; and the cylindrical one is more preferred. When the cylindrical tank-shaped mixing apparatus is used, it may be placed vertically or placed horizontally. The diameter is preferably 0.2 m to 10 m in industrial settings.

The tank-shaped mixing apparatus is preferably one with a stirring mechanism; and examples of the stirring mechanism include commonly known methods such as a liquid phase stirring method by an impeller, a stirring method by a continuous double shaft mixer, a stirring method by a homogenizer, ultrasonic irradiation, and tank-shaped mixing apparatus that houses a static mixing; and from the viewpoint of costs of equipment and versatility, preferred is a tank-shaped mixing apparatus that houses a dynamic mixing structure such as an impeller, a continuous double shaft mixer, or a homogenizer.

Examples of the tank-shaped mixing apparatus that houses the dynamic mixing structure include a tank-shaped mixing apparatus where one or more mixing elements move rotationally to promote mixing contents, wherein the movable part is present in the mixing element.

When an impeller is used as one or more mixing elements, specific examples thereof include propeller, paddle, flat paddle, turbine, double cone, single cone, single ribbon, double ribbon, screw, and helical ribbon. As long as shear stress can be applied to the system, it is not in particular limited to those. For efficient stirring, a baffle or the like may also be placed inside of the tank.

The shape of the tubular mixer, like that of tank-shaped mixing apparatus may be any shape as long as emulsification is feasible when the polymer A and the polymer B are dissolved in and mixed with the organic solvent and is not in particular restricted. The diameter is preferably 0.002 m to 1 m in industrial settings. In addition, a ratio of the length to the inner diameter is preferably 3 to 1000. It is still more preferably 10 to 500.

As the tubular mixer, one with a stirring mechanism is preferred. Examples of the stirring mechanism include commonly known methods such as a liquid phase stirring method by an impeller, a stirring method by a continuous double shaft mixer, a mixing method by a homogenizer, ultrasonic irradiation, a tubular mixer that houses a static mixing; and from the viewpoint of costs of equipment and installation space, a tubular mixer that houses a static mixing is preferred.

Examples of the tubular mixer that houses the static mixing include a tubular mixer in which a mixing element without a movable part is fixed.

Examples of the mixing element include ones that mix a solution by altering the split of the flow of the solution flowing into a tube and the direction thereof and alternating between split and merger; and examples of such a tubular reactor include type SMX and SMR type Sulzer system line mixers, and a static-type in-tube mixer system line mixer of Toray Industries, Inc. Any apparatus may be used as long as the solution phase containing the polymer A as a major component is able to form emulsions that form particulate droplets. The apparatus may be solely used; two or more thereof may be used; or different types thereof may be used in combination.

It is important to allow the polymer A to continuously precipitate and to be taken out by continuously adding the emulsion formed in the aforementioned section and the poor solvent to the vessel. Here, the vessel needs to be a vessel that has a supply port and an output port. The shape of the vessel is not in particular restricted as long as the poor solvent can be continuously added and the particles can be continuously taken out; and may be tank-shaped or may be tubular.

The form of tank-shaped vessel may be any as long as the poor solvent is able to be added and is not in particular restricted The diameter is preferably 0.2 m to 10 m in industrial settings.

The tank-shaped vessel preferably has a stirring mechanism and, in that case, the same structure as the stirring mechanism of the above tank-shaped mixing apparatus can be used.

The shape of tubular vessel, like that of tank-shaped vessel, may be any shape as long as the poor solvent can be added and is not in particular restricted. The diameter is preferably 0.002 m to 1 m in industrial settings. In addition, a ratio of the length to the inner diameter is preferably 3 to 1000. Still more preferably, it is 10 to 500.

The tubular vessel may be one with a stirring mechanism inside or may be a piping without a stirring mechanism. When the stirring mechanism is available, the same structure as the stirring mechanism of the above tank-shaped mixing apparatus can be used.

To continuously add the poor solvent to the tubular vessel, the addition is preferably at 2 or more sites and more preferably the addition is made at 3 to 10 sites. Also, when the poor solvent is added at 2 or more sites, a part for mixing the emulsion with the poor solvent may be one with a stirring mechanism inside or may be a piping without a stirring mechanism.

The connection of the vessel in a stage following the mixing apparatus and continuous addition of the poor solvent as described above enable formation of the emulsion and precipitation of the polymer particles to continuously take place.

When both of the mixing apparatus used for formation of the emulsion and the vessel to which the poor solvent is added are tubular, use of a continuous tubular vessel enables formation of the emulsion and addition of the poor solvent to be carried out at the same time. In this case, it is necessary that the emulsion be formed in the input stage of one or more tubular vessel and the poor solvent be added in the output stage.

The amount of poor solvent added depends on the state of the emulsion; and is preferably 0.1 to 10 parts by mass to 1 parts by mass of total emulsion mass, more preferably 0.1 to 5 parts by mass, still more preferably 0.2 to 3 parts by mass, in particular preferably 0.2 parts by mass to 2 parts by mass, and most preferably 0.2 to 1.0 parts by mass.

When the poor solvent is added from 2 or more sites, the amount of the poor solvent added from each of the sites may or may not be equal. A ratio of the maximum amount added to the minimum amount added depends on the state of the emulsion. When the amount of the poor solvent added from each of the sites is not equal, the ratio is 50/1 or less and preferably 10/1 or less.

A period of time to bring the poor solvent into contact with the emulsion is only required to be a sufficient period of time to allow the particles to precipitate; and is, to induce sufficient precipitation and attain efficient productivity, 5 minutes to 50 hours after the completion of the addition of the poor solvent, more preferably 5 minutes or more and 10 hours or less, still more preferably 10 minutes or more and 5 hours or less and in particular preferably 20 minutes or more and 4 hours or less. By carrying out the contact within this preferred range of time period, aggregation among the particles can be prevented and reduced upon conversion of the emulsion to the polymer particles, thereby obtaining the polymer particles with narrow particle diameter distribution.

By subjecting the polymer particle dispersion liquid produced as just described to solid-liquid separation by a commonly known method such as filtration, filtration under reduced pressure, filtration under applied pressure, centrifugal separation, centrifugal filtration, and spray drying, particle powders is able to be recovered.

The polymer particles obtained by the solid-liquid separation is as needed washed with a solvent or the like, thereby removing impurities sticking to or contained in the particles to carry out purification.

Recycling is feasible, wherein the organic solvent and the polymer B separated in the step of solid-liquid separation are reused, which step is carried out when particle powders are obtained.

The organic solvent obtained by the solid-liquid separation is a mixture of the polymer B, the organic solvent, and the poor solvent. By removing the poor solvent from this organic solvent, the organic solvent can be reused as an organic solvent for emulsion formation. A method of removing the poor solvent is carried out by a commonly known method. Specific examples thereof include simple distillation, reduced pressure distillation, precision distillation, thin film distillation, extraction, and membrane separation; and preferred is a method by simple distillation, reduced pressure distillation, or precision distillation.

In the same manner as when the polymer particles are produced, when the distillation procedure such as simple distillation or reduced pressure distillation is carried out, heat can possibly be involved in the system to promote thermal breakdown of the polymer B and the organic solvent. Because of that, the distillation procedure is preferably carried out in a condition where no oxygen is present as much as possible and more preferably carried out under inert atmosphere. Specifically, it is carried out under a condition of nitrogen, helium, argon, or carbon dioxide. In addition, a phenolic compound may also be added again as an antioxidant.

At the time of recycling, it is preferred to remove as much poor solvent as possible; and the amount of poor solvent left in the poor solvent is specifically 10% by mass or less based on the total amount of the organic solvent and polymer B recycled, preferably 5% by mass or less, more preferably 3% by mass or less, and in particular preferably 1% by mass or less. If the amount of the poor solvent left in the poor solvent falls in this preferred range, the particle diameter distribution of the particles is sufficiently narrow and the particles do not aggregate.

The amount of the poor solvent in the organic solvent used in the recycling can be measured by a commonly known method; and can be measured by a gas chromatography method, Karl Fischer's method, or the like.

In the procedure of removing the poor solvent, there may be a loss of the organic solvent, the polymer B, or the like in practice. Therefore, it is preferred to readjust to an initial composition ratio accordingly.

The particle diameter of the thus obtained particles is usually 1000 µm or less. Preferably, it is 500 µm or less. More preferably, it is 300 µm or less. Still more preferably, it is 100 µm or less. Particularly preferably, one with a particle diameter of 50 µm or less can be produced. The lower limit is usually 50 nm or more. Preferably, it is 100 nm or more. More preferably, it is 500 nm or more. Still more preferably, it is 1 µm or more. Particularly preferably, it is more than 1 µm. Significantly preferably, it is 2 µm or more. Most preferably, one with a lower limit of 10 µm or more can be produced.

The average particle diameter of the particles can be calculated by specifying the diameter of freely-selected 100 particles from a scanning electronic microscope photograph and determining the arithmetic average thereof. When the particles are not exactly circular, that is, oval, the maximum diameter thereof is regarded as the particle diameter thereof. To precisely measure the particle diameter, the measurement is carried out at a magnification of at least 1000× or more and preferably 5000× or more.

The method produces particles via emulsions composed of a polymer A solution phase and a polymer B solution phase; and is therefore suitable in particular to produce polymer particles with narrow particle diameter distribution, an average particle diameter of 10 nm or more, and high heat resistance, that is, polymer particles having a glass transition temperature or melting point of 100° C. or more, the production of which polymer particles has thus far been difficult.

However, while the production method is suitable for producing particles of the polymer A with high heat resistance, it is not necessarily limited to the particles of the polymer A with high heat resistance. That is, the method is also suitably used for resins that have a relatively low glass transition temperature or melting point but exhibit insufficient solubility, which resins are required to be dissolved at a high temperature. Thus, among polymers, ones with a glass transition temperature or melting point of 50° C. or more can be subjected to the method as well. The method is suitable preferably for ones with 100° C. or more and still more preferably for ones with 150° C. or more. As for the upper limit, the method is suitable for ones with 400° C. or less from the viewpoint of solubility.

In particular, there are in recent years a large number of applications for polymer particles, which applications require particle diameter distribution to be narrow and at the same time require materials to have higher heat resistance. In vinyl-based polymers, such problems are typically solved by crosslinking or using a particular kind of monomer. Yet, our method does not require such a special polymer design and enables polymers with high heat resistance to be made into particles without a polymer design being modified, which is preferred.

The glass transition temperature used herein refers to glass transition temperature (Tg) observed when the temperature is increased in a temperature increase condition of a rate of increasing temperature of 20° C./min from 30° C. to a temperature 30° C. greater than a predicted glass transition temperature; kept for one minute, decreased once to 0° C. in a temperature decrease condition of 20° C./min, kept for one minute, and then increased again in a temperature increase condition of 20° C./min for measurement using a differential scanning calorimetry method (DSC method).

In addition, the melting point refers to a peak top temperature when the heat of melting is exhibited at the time of the second temperature increase.

Further, our method is suitable for obtaining polymer particles of thermoplastic resins such as polyether sulfone, polycarbonate, vinyl-based polymer, polyamide, polyetherimide, polyphenyleneether, polyphenylenesulfide, polyolefin, polysulfone, polyester, polyether ketone, and polyetherether ketone; and in particular polymer particles with high heat resistance.

The particles prepared by our method as just described exhibit a deviation from the average of the number average particle diameter of 3.0% or less. In addition, highly uniform particles whose particle diameter distribution index is 2.0 or less are able to be obtained; and the particles are produced using polymers and in particular, high quality particles of a polymer with excellent heat resistance quality can be stably produced. Therefore, the method is able to be extremely practically used in a variety of applications in industrial settings.

EXAMPLES

By way of the examples, our method will be described in detail below; but this disclosure is not limited thereto.

(1) Method of Measuring the Number Average Particle Diameter and Particle Diameter Distribution Index of Particles—1

The number average particle diameter of particles can be calculated by measuring the diameter for 100 particles that are randomly selected from a photograph of a scanning electronic microscope (a scanning electronic microscope manufactured by JEOL LTD, JSM-6301 NF) and determining the arithmetic average thereof. When the shape of the particles is not exactly circular, that is, oval in the above photograph, the maximum diameter of the particles is regarded as the particle diameter thereof. The measurement is carried out at a magnification of at least 1000× or higher and preferably 5000× or higher to precisely measure the particle diameter.

Further, the particle diameter distribution index is calculated based on the following a numerical conversion formula using the measurement value of the particle diameter obtained by the above measurement.

$$Dn = \sum_{i=1}^{n} Ri/n$$

$$Dv = \sum_{i=1}^{n} Ri^4 \Big/ \sum_{i=1}^{n} Ri^3$$

$$PDI = Dv/Dn$$

wherein, Ri: the particle diameter of individual particle, n: the number of the measurement (=100), Dn: the number average particle diameter, Dv: the volume average particle diameter, and PDI: particle diameter distribution index.

(2) Method of Measuring the Number Average Particle Diameter and Particle Diameter Distribution Index of Particles—2

When the measurement by stereomicroscopical observation with a scanning electronic microscope is difficult in the measurement of the number average particle diameter of the particles, particles dispersed into water were subjected to measurement using a laser diffraction and light scattering system particle size analyzer manufactured by NIKKISO Co., Ltd., Microtrac MT3300 EXII; and the obtained was regarded as the number average particle diameter. In addition, as for the particle diameter distribution index, a numerical value obtained by dividing the volume average particle diameter obtained from the measurement by the number average particle diameter was used.

Measurement conditions are as follows.
Device employed: Microtrac MT3300 EXII manufactured by NIKKISO Co., Ltd.
Analysis software DMS Ver. 11.0.0-246 K from the same company as above
Measurement dispersion medium: ion-exchanged water
Solvent refractive index: 1.333
Measurement time: 10 seconds
The number of measurement: Once
Particle refractive index: 1.60
Transparency: transmitting
Shape: non-spherical Example 1 Production Method of Polyether Sulfone Particles To a 50 mL flask, added were 2.5 g of polyether sulfone (weight average molecular weight 67,000, manufactured by SUMITOMO CHEMICAL Co., Ltd., "SUMIKAEXCEL" (registered trademark) 5003P) and 22.5 g of N-methyl-2-pyrrolidone (manufactured by Mitsubishi Chemical Corp.) as polymer A; and 2.5 g of polyvinyl alcohol (manufactured by Nippon Synthetic Chemical Industry Co., Ltd., "GOHSENOL" (registered trademark) GL-05) and 22.5 g of N-methyl-2-pyrrolidone as polymer B; and the resulting mixture was heated at 80° C., stirred until the polymer was dissolved, and then allowed to return back to room temperature. We confirmed that the mixture separates into two phases when an equal amount of each liquid is mixed and left to stand. A polymer A solution and a polymer B solution are each set to be able to be supplied to a tubular mixer (MHM-0.7-10-S manufactured by Toray Engineering Co., Ltd., inner diameter: ⅛ inch, length: 83 mm) that houses a static mixing by a supply pump (HYM-08P manufactured by Fuji Techno Industries Corporation, pipe diameter: 2 mm). Piping (pipe diameter: 2 mm, length: 2000 mm) connected to the secondary side of the micromixer is installed such that a poor solvent can be added from four sites by the supply pump; and the distance between the micromixer and the first poor solvent addition port is 100 mm and the second or later poor solvent addition ports are apart each other at a distance of 500 mm (pipe diameter: 2 mm). The polymer A solution and the polymer B solution were each supplied to a tubular mixer that houses a static mixing at 0.2 mL/min; and thereafter ion-exchanged water was used as the poor solvent and added into the piping from the four sites each at flow rate of 0.1 mL/min using a poor solvent addition pump (NP-KX-120 manufactured by Nihon Seimitsu Kagaku Co., Ltd.). The obtained suspension was taken in three separate beakers every 30 minutes. Each was filtered and washed with 50 g of ion-exchanged water; and the filtrand was subjected to vacuum drying at 80° C. for 10 hours to each obtain 0.6 g of white solid. The obtained powders were observed with a scanning electronic microscope and found to be particles, each of which had a number average particle diameter of 90 nm, 90 nm, and 90 nm, and had a particle diameter distribution index of 1.12, 1.20, and 1.09.

Example 2 Production Method of Polylactic Acid Particles

To a 50 mL flask, added were 3.5 g of polylactic acid (dextrorotatory isomer 1.2%, weight average molecular weight (in terms of PMMA) 160,000, melting point 168° C.) and 22.0 g of ethyl acetoacetate as polymer A; and 3.5 g of polyvinylpyrrolidone (manufactured by NIPPON SHOKUBAI Co., Ltd., weight average molecular weight 844,000) and 22.0 g of ethyl acetoacetate as polymer B; and the resulting mixture was heated at 95° C. and stirred until the polymer was dissolved. We confirmed that the mixture separates into two phases when an equal amount of each liquid is mixed and left to stand. A polymer A solution and a polymer B solution are each set to be able to be supplied to a 200 ml separable flask with a helical ribbon impeller by a supply pump (manufactured by Yamazen Co., Ltd., QG150, pipe diameter: 2 mm). A discharge port of the supply pump (manufactured by Yamazen Co., Ltd., QG150, pipe diameter: 2 mm) installed in piping in the outlet side of the separable flask is able to add a poor solvent by a poor solvent addition pump (manufactured by Nihon Seimitsu Kagaku Co., Ltd., NP-KX-120); and is subsequently connected with a static mixer (manufactured by Noritake Co., Ltd., T3, inner diameter: 3.4 mm, length: 100 mm) as a tubular vessel that houses a static mixing. The polymer A solution and the polymer B solution were each supplied the 200 ml separable flask with the helical ribbon impeller at 3 g/min; and the mixture was then stirred for 30 minutes to allow emulsions to be formed. Thereafter, the temperature of the system was decreased to 40° C.; and the resultant was added to the inlet of the tubular vessel at 6 g/min by the supply pump that was installed in piping in the outlet side of the separable flask with ethanol being used as a poor solvent and added at a rate of 6 g/min.

The suspension obtained from the outlet of the tubular vessel was taken in three separate beakers every two minutes. Each was filtered and washed with 50 g of ethanol; and the filtrand was subjected to vacuum drying at 50° C. for 10 hours to obtain 0.8 g each of white solid. The obtained powders were observed with a particle size analyzer and found to be particles, each of which had a number average particle diameter of 7.6 μm, 7.7 μm, and 7.6 μm, and had a particle diameter distribution index of 1.42, 1.44, and 1.44.

Comparative Example 1 Production of Polyether Sulfone Particles by a Batch Method To a 100 ml four-necked flask, added were 2.50 g of polyether sulfone (weight average molecular weight 67,000, "SUMIKAEXCEL" (registered trademark) 5003P manufactured by SUMITOMO CHEMICAL Co., Ltd.) as polymer A, 45 g of N-methyl-2-pyrrolidone as an organic solvent, and 2.50 g of polyvinyl alcohol "GOHSENOL" (registered trademark) GL-05 manufactured by Nippon Synthetic Chemical Industry Co., Ltd.) as polymer B; and the resulting mixture was heated at 80° C. and stirred until the polymer was dissolved. The temperature of the system was allowed to return back to room temperature; and thereafter 50.0 g of ion-exchanged water was added dropwise as a poor solvent to the system via a supply pump at a rate of 0.410 g/min while at the same time stirring it at 450 rpm. At the moment about 12.0 g of ion-exchanged water was added, the color of the system turned to white. After the entire volume of the water was completely put in, the resultant was stirred for 30 minutes; and the obtained suspension was filtered and washed with 100 g of ion-exchanged water. The filtrand was subjected to vacuum drying at 80° C. for 10 hours, thereby obtaining 2.0 g of white solid. These procedures were carried out under the same conditions except that the amount of polyether sulfone fed was altered to 2.48 g and 2.52 g, which results in the procedures being carried out three times in total. The obtained powders were observed with a scanning electronic microscope and found to be particles, each of which had a number average particle diameter of 14.6 μm, 15.3 μm, and 14.4 μm; and had a particle diameter distribution index of 1.29, 1.36, and 1.30.

Comparative Example 2 Production of Polylactic Acid Particles by a Batch Method

To a 200 ml four-necked flask, added were 3.5 g of polylactic acid (dextrorotatory isomer 1.2%, weight average molecular weight (in terms of PMMA) 160,000, melting point 168° C.) as polymer A, 44.0 g of ethyl acetoacetate an organic solvent, and 3.5 g of polyvinylpyrrolidone (manufactured by NIPPON SHOKUBAI Co., Ltd., weight average molecular weight 844,000) as polymer (B); and the resulting mixture was heated until its inner temperature reached 95° C. and stirred until the polymer was completely dissolved. Thereafter, the temperature of the system was decreased to 40° C. while the stirring was continued. At that time, emulsions were formed in the system. Continuously, 25 g of ethanol was added as a poor solvent thereto in a lump. After the entire volume of ethanol was completely put in, the resultant was stirred for another 10 minutes; and 25 g of ethanol was subsequently added thereto in a lump. After the entire volume of ethanol was completely put in, the resultant was stirred for another 10 minutes and the temperature thereof was allowed to decrease to room temperature. The obtained suspension was filtered, washed with 50 g of ethanol, and filtered out. The obtained cake was subjected to vacuum drying at 50° C. for 10 hours to obtain 3.2 g of white solid in a form of powder. These procedures were carried out under the same conditions except that the amount of polylactic acid fed was altered to 3.47 g and 3.53 g, which results in the procedures being carried out three times in total. The obtained powders were analyzed by a particle size analyzer and found to be particles, each of which had a number average particle diameter of 6.9 μm, 7.4 μm, and 8.7 μm; and had a particle diameter distribution index of 2.02, 1.92, and 2.30.

INDUSTRIAL APPLICABILITY

The use of our method as described allows for continuous production of polymer particles with lower variability in the average particle diameter and smaller particle diameter distribution index and, therefore, simplified steps of recovering and purifying polymer particles as well as a smaller production facility are feasible, which makes it easier to adapt the method to industrial manufacturing with a high productivity. As specific applications, our method can be used for materials for flash molding, materials for rapid prototyping and rapid manufacturing, paste resins for plastic sol, powder blocking materials, powder fluidity improving materials, lubricants, rubber compounding agents, abrasives, thickeners, filter materials and filter aids, gelling agents, flocculants, additives for coating materials, oil absorbents, releasing agents, slip improving agents for plastic films and sheets, antiblocking agents, gloss regulators, matting finishing agents, light diffusion agents, surface hardness improving agents, toughness improving materials, and other various modifiers; spacers for liquid crystal display device, fillers for chromatography, substrates and additives for cosmetic foundation, auxiliary agents for microcapsule, materials for medical use such as drug delivery systems and diagnostic drugs, flavor retaining agents and pesticide retaining agents, catalysts for chemical reaction and supports thereof, gas adsorbent, sintered materials for ceramic processing, standard particles for measurement and analysis, particles for the field of food industry, materials for powder coating material, and toners for electrophotography development.

Our method has high applicability as a technology to produce these promising materials.

The invention claimed is:

1. A method of producing polymer particles comprising, in a system in which a polymer A and a polymer B are dissolved in and mixed with an organic solvent to undergo phase separation into two phases which are a solution phase containing said polymer A as a major component and a solution phase containing said polymer B as a major component, continuously adding an emulsion comprising said polymer A, said polymer B and said organic solvent, and a poor solvent for said polymer A to a vessel continuously to allow said polymer A to precipitate; and separating polymer A particles from said vessel continuously.

2. The method according to claim 1, wherein said emulsion formed by continuously supplying said polymer A, said polymer B, and said organic solvent to a mixing apparatus is added to said vessel.

3. The method according to claim 1, wherein said emulsion formed by continuously supplying each of a polymer A solution in which said polymer A is dissolved in said organic solvent and a polymer B solution in which said polymer B is dissolved in said organic solvent to said mixing apparatus is added to said vessel.

4. The method according to claim 1, wherein said organic solvents in each of said phases when said phase separation into two phases occurs are identical.

5. The method according to claim 1, wherein said poor solvent is continuously added from two or more addition ports.

6. The method according to claim 1, wherein said vessel is a tubular vessel.

7. The method according to claim 2, wherein a tubular mixer is used as said mixing apparatus.

8. The method according to claim 2, wherein said mixing apparatus is a mixing apparatus that houses a static mixing.

9. The method according to claim 6, wherein formation of said emulsion and addition of said poor solvent are carried out in a continuous tubular vessel.

* * * * *